US010578867B2

(12) United States Patent
Nguyen et al.

(10) Patent No.: US 10,578,867 B2
(45) Date of Patent: Mar. 3, 2020

(54) HEAD-UP DISPLAY WITH HOLOGRAPHIC OPTICAL ELEMENT

(71) Applicant: Visteon Global Technologies, Inc., Van Buren Township, MI (US)

(72) Inventors: Giang-Nam Nguyen, Karlsruhe (DE); Patrick Nebout, Saint-Cloud (FR); Benoit Chauveau, Mery sur Oise (FR)

(73) Assignee: Visteon Global Technologies, Inc., Van Buren Township, MI (US)

( * ) Notice: Subject to any disclaimer, the term of this patent is extended or adjusted under 35 U.S.C. 154(b) by 130 days.

(21) Appl. No.: 15/792,985

(22) Filed: Oct. 25, 2017

(65) Prior Publication Data

US 2019/0121130 A1   Apr. 25, 2019

(51) Int. Cl.
*G02B 27/01* (2006.01)
*G06K 9/00* (2006.01)
*G03H 1/22* (2006.01)

(52) U.S. Cl.
CPC ........... *G02B 27/0103* (2013.01); *G03H 1/22* (2013.01); *G06K 9/00671* (2013.01); *G02B 2027/0107* (2013.01); *G02B 2027/0121* (2013.01); *G02B 2027/0123* (2013.01); *G02B 2027/0181* (2013.01)

(58) Field of Classification Search
None
See application file for complete search history.

(56) References Cited

U.S. PATENT DOCUMENTS

2006/0215244 A1* 9/2006 Yosha ................ G02B 27/0101
                                                                359/15
2012/0250306 A1  10/2012 Sugiyama et al.
2015/0323793 A1* 11/2015 Sakai ................. G02B 27/0018
                                                               359/223.1

FOREIGN PATENT DOCUMENTS

| EP | 0216692 A2 | 4/1987 |
| EP | 0278395 A2 | 8/1988 |
| EP | 0391231 A2 | 10/1990 |
| EP | 0486165 A1 | 11/1990 |
| FR | 2799008 A1 | 3/2001 |
| WO | WO2016146697 A1 | 9/2016 |

OTHER PUBLICATIONS

International Search Report issued in international application PCT/EP2018/078565 dated Jan. 31, 2019.

* cited by examiner

*Primary Examiner* — Jennifer D. Carruth
(74) *Attorney, Agent, or Firm* — Quinn IP Law

(57) ABSTRACT

A head-up display device for displaying a virtual image superimposed over a field of view to a viewer is provided. The head-up display device includes a picture generating unit having an illumination source, such as a laser, to generate a real image following a first light beam. A windshield of a vehicle engages the first light beam, either at an inclined angle or perpendicular, to reflect the first light beam away from the viewer as reflected images. A combiner disposed on the windshield including a holographic optical element steers the first light beam toward the viewer as a third light beam to present the virtual image within the field of view of the viewer. Mirrors may direct and magnify first light beam onto the combiner. A method for displaying a virtual image superimposed over a field of view to a viewer using a head-up display device is also provided.

19 Claims, 4 Drawing Sheets

HEAD-UP DISPLAY WITH HOLOGRAPHIC OPTICAL ELEMENT

BACKGROUND

It is known from the state of the art how to project information in the field of sight of a user, such as, for example, a driver or a pilot, by means of a head-up display, or HUD.

Such head-up displays generally feature a picture generating unit, which provides the information to be represented in the form of an image, an optical module, which permits the beam path through the head-up display as well as a combiner, to superimpose the image over a background view. Additional optical devices such as mirrors and lenses may also be included to guide the image onto the combiner. In some cases, the windshield of a vehicle is used as the combiner. The viewer, who may be the driver of the vehicle, sees an image from the picture generating unit superimposed with the actual surroundings behind the windshield. The attention of the vehicle driver, for example, when driving a motor vehicle, therefore remains focused on that which is occurring in front of the vehicle, while they are able to grasp the information that is projected in the field of vision.

As illustrated in FIG. 1, a common problem with head-up displays is the creation of double images that may result, for example, where the image is projected upon a device such as a windshield that has two or more surfaces or other interfaces between materials having different indices of refraction (e.g. between glass and air). The two surfaces or interfaces may each produce a separate reflection, with the reflections being offset from one another, which may appear as double-images. Double-images that are close enough together may also appear as a blurry image, or one which is out of focus.

One solution to the problem of double-images known from the prior art is to use a wedge-shaped windshield with surfaces that are not substantially parallel to one-another. Such wedge-shaped windshields have drawbacks including production costs and added weight of materials such as glass.

Another existing solution known from the prior art is to use a normal, panel windshield with a coating and with polarized light used for illumination. However, the combination of polarized illumination with a windshield having a coating has the drawback of producing virtual images with relatively low brightness.

SUMMARY

A head-up display device is provided for displaying a virtual image superimposed over a field of view to a viewer. The subject head-up display device includes a picture generating unit having an illumination source to generate a real image which goes in the direction of a first light beam creating the virtual image by reflecting through one or more surfaces. The illumination source may include one or more light sources, which may be lasers to generate the real image following the first light beam, and which may have different colors to provide the virtual image as a color image.

The subject head-up display device includes a windshield of a vehicle including an inner surface and an outer surface to engage the first light beam at an angle of incidence and to cause the first light beam to reflect therefrom as a second and a fourth light beam, respectively, carrying reflected images directed away from the viewer to cause the reflected images to not be visible to viewer. The subject head-up display device also includes the first light beam intersecting a combiner that includes a holographic optical element (HOE), such as a transparent holographic thin film, to steer the first light beam therefrom as a third light beam in the direction of the viewer to present the virtual image within the field of view of the viewer. The holographic optical element may store the optical function of a lens or mirror, such as by having been recorded using a reference beam and an object beam from the lens or mirror.

The holographic optical element may be disposed on a surface of the windshield. Alternatively, the holographic optical element may be integrated within the windshield. The subject head-up display device may further one or more mirrors which may be concave to magnify and reflect the first beam onto the combiner. One or more of the mirrors may be tillable fear adjusting the position of the first beam on the combiner, which may thereby adjust the location of the virtual image within the field of view of the viewer.

A method for displaying a virtual image with a head-up display device is also provided. The method includes the steps of providing a combiner including a holographic optical element on a windshield of a vehicle. The method includes projecting a first light beam by a picture generating unit (PGU) and reflecting the first light beam away from the viewer by the inner surface and the outer surface of the windshield as a second light beam and a fourth light beam, respectively. The method also includes steering the first light beam to the viewer by the holographic optical element as a third light beam. The method may also include the step of recording the optical function of a lens or a mirror onto the holographic optical element, which may be a transparent holographic thin film.

The method may further include the step of adjusting the position of the first light beam on the combiner by tilting a mirror. The method may also include reflecting the first light beam onto a second mirror by a first mirror. In other words, two or more mirrors may be used to direct the light beam from the picture generating unit to the combiner.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
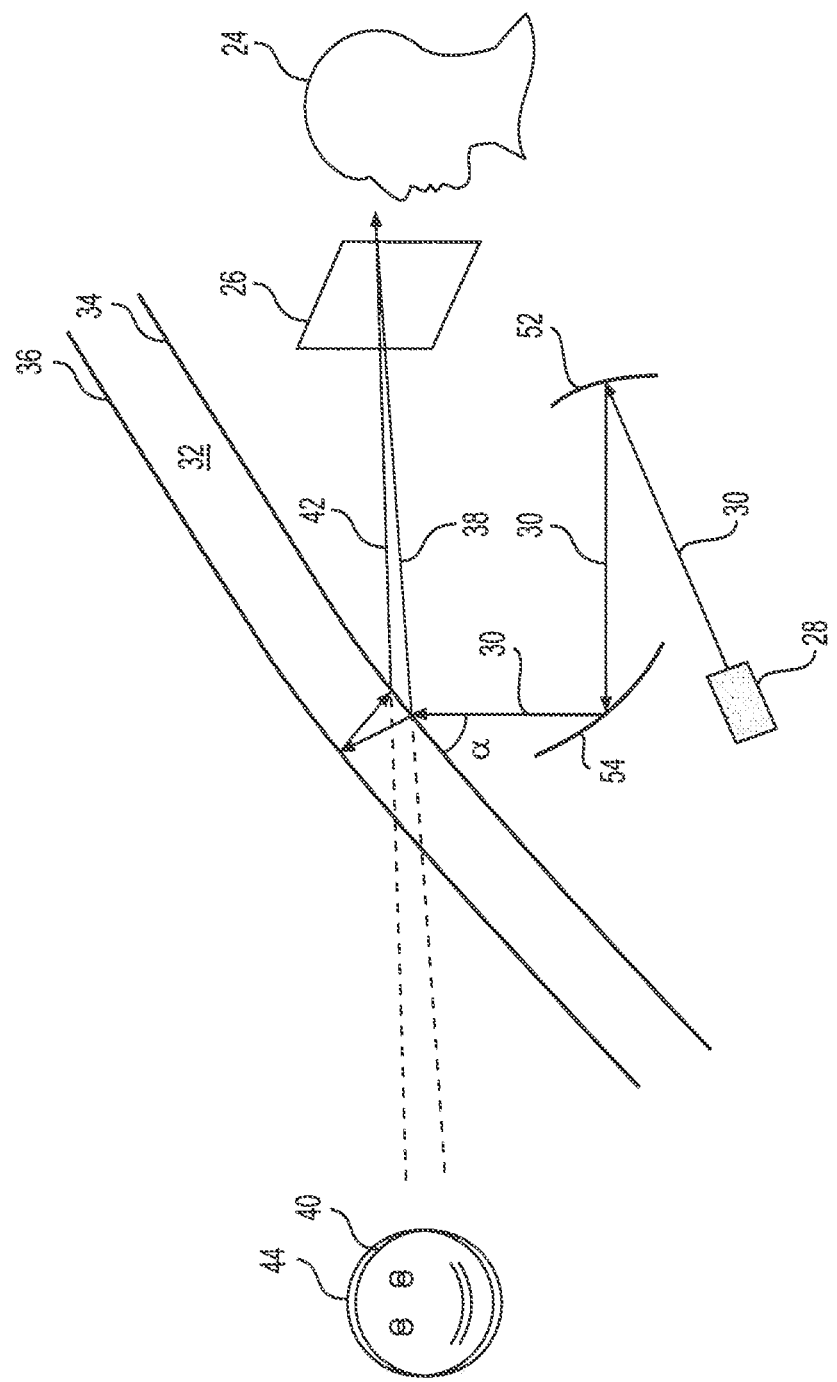
FIG. 1 is a schematic diagram of a head-up display device of the prior art.
Figure 2:
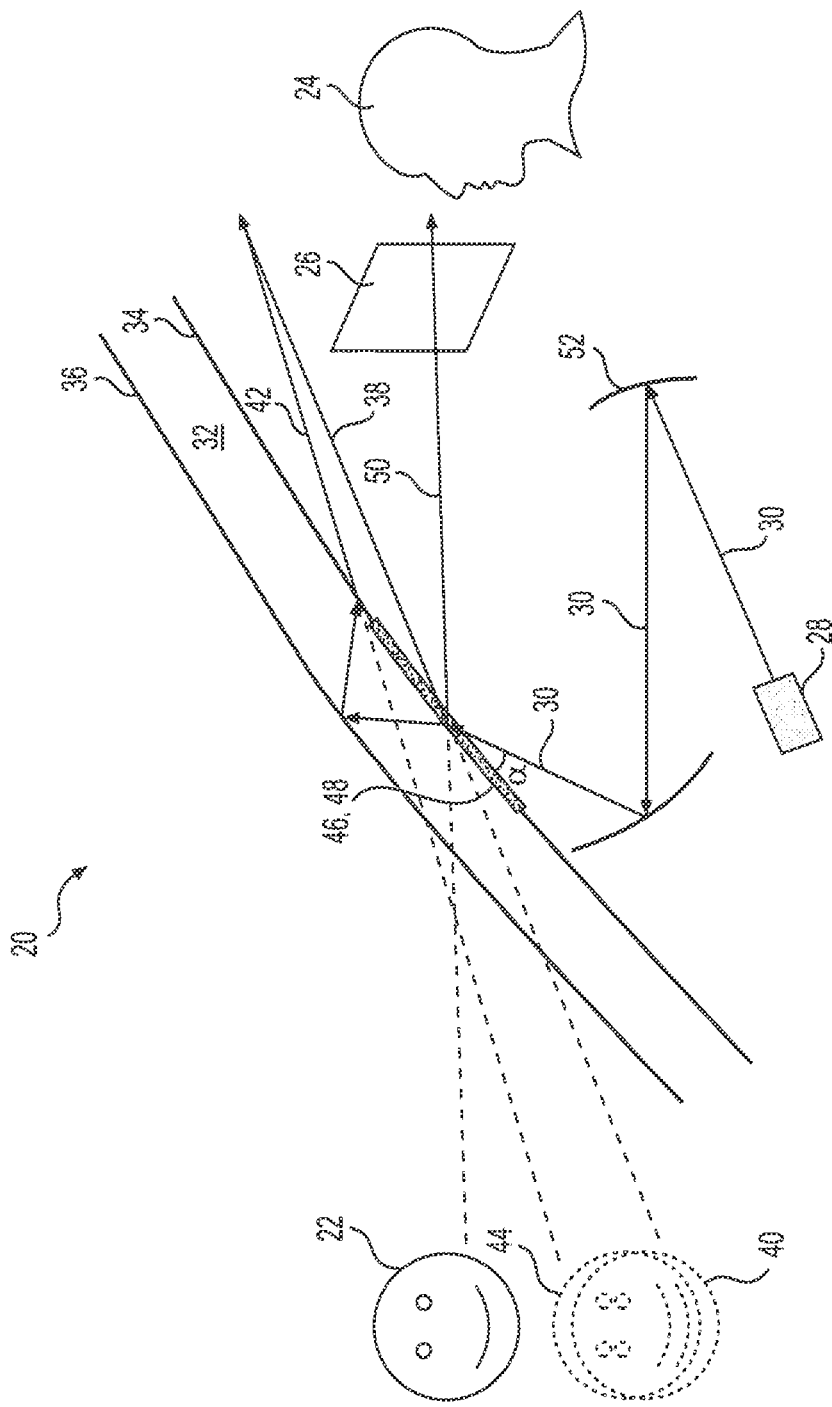
FIG. 2 is a schematic diagram of an embodiment for a head-up display device.

Referring to the Figures, wherein like numerals indicate corresponding parts throughout the several views, a head-up display device 20 for displaying a virtual image 22 superimposed over a field of view to a viewer 24 is provided. As illustrated in FIGS. 1-2, the virtual image 22 may be provided at an eye box 26 region of space representing a range of normal viewing positions where the viewer 24 may be located.

According to an aspect, the head-up display device 20 includes a picture generating unit 28 having an illumination source which may include one or more light sources of different colors to generate a first light beam 30 creating the virtual image 22.

As shown in FIG. 2, a windshield 32 of a vehicle may include an inner surface 34 and an outer surface 36 substantially parallel thereto to engage the first light beam 30 at an angle of incidence α, which may be configured as an inclined angle to cause the first light beam 30 to reflect from the inner surface 34 as a second light beam 38 carrying a first reflected image 40. The angle of incidence α may also be configured co to cause the first light beam 30 to engage the outer surface 36 and to exit the windshield 32 as a fourth light beam 42 carrying a second reflected image 44. More specifically, the inclined angle of incidence α may cause each of the second light beam 38 and the fourth light beam 42 to be directed away from the viewer 24 to cause the reflected images 40, 44 to not be visible to viewer 24.

As shown in FIG. 2, a combiner 46 may be disposed on the windshield 32 in a position that intersects the first light beam 30. The combiner 46 includes a holographic optical element 48 (HOE), which may be a transparent holographic thin film, to steer the first light beam 30 therefrom as a third light beam 50 in the direction of the viewer 24 to present the virtual image 22 within the field of view of the viewer 24. In other words, the interaction between the first light beam 30 and the holographic optical element 48 does not follow the law of reflection, allowing the third light beam 50 to be "steered" in a desired direction where the angle of reflection is not equal to the angle of incidence.

As shown in FIG. 2, the holographic optical element 48 may be disposed on a surface of the windshield 32. Alternatively, the holographic optical element 48 may be integrated within the windshield 32, such as, for example, by being sandwiched between lamination layers that comprise the windshield 32.

Figure 3:
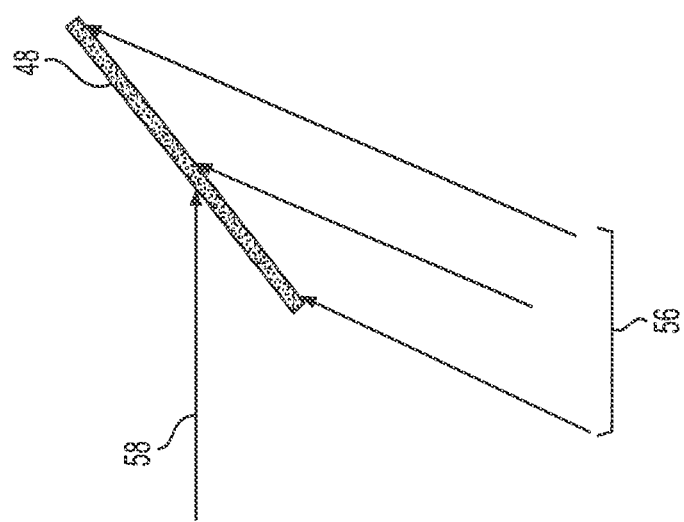
FIG. 3 is a schematic diagram for the recording of a reflective holographic optical element.

According to an aspect, and as illustrated in FIG. 3, the holographic optical element 48 may store the optical function of a lens or a mirror, which may, for example, result from the holographic optical element 48 having been recorded using a reference beam 56 and an object beam 58 coming from the lens or mirror.

As shown in FIGS. 1-2, the head-up display device 20 may include a first mirror 52, which reflects the first light beam 30 from the illumination source to display the virtual image 22 to the viewer 24. The first mirror 52 may be a concave mirror which may cause the virtual image 22 to be magnified. The folded optical path may allow for the head-up display device 20 to occupy a reduced package size, which may allow it to be placed, for example, within the dashboard of a vehicle.

As shown in FIGS. 1-2, the head-up display device 20 may also include a second mirror 54 to direct the first light beam 30 onto the combiner 46. According to an aspect, at least one of the mirrors 52, 54 may be tillable for adjusting the position where the first light beam 30 intersects the combiner 46 and thereby adjusting the location of the virtual image 22 within the field of view of the viewer 24. Such a tilting function may allow the virtual image to be in a useful overlay position for different positions such as, for example, for viewers having different heights or different seating positions. The second mirror 54 may be a concave mirror which may cause the virtual image 22 to be magnified.

Figure 4:
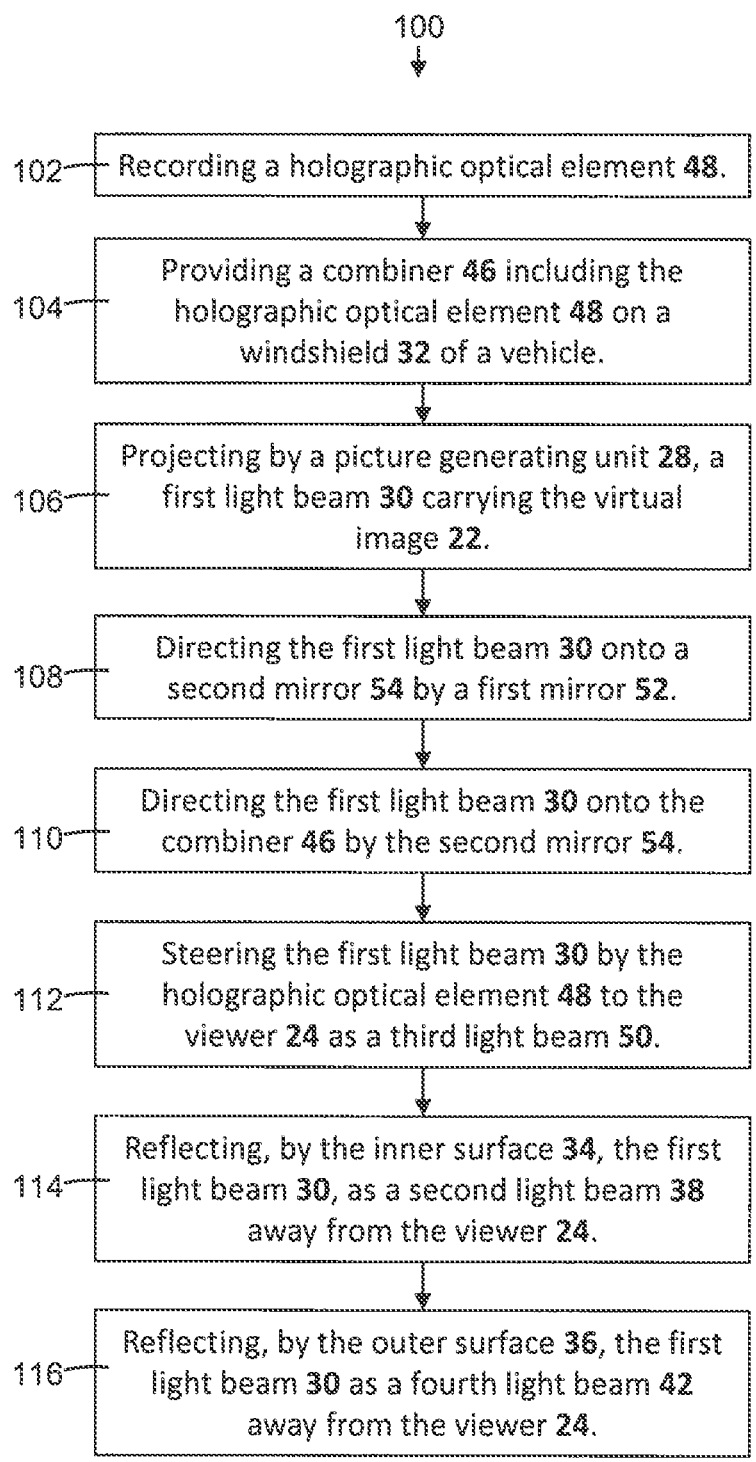
FIG. 4 is a flow chart of a method for displaying a virtual image with a head-up display device.

A method 100 for displaying a virtual image 22 superimposed over a field of view to a viewer 24 using a head-up display device 20 is also provided and is illustrated in the flow chart of FIG. 4. The method 100 may include 102 recording a reflective holographic optical element. The step of 102 recording a holographic optical element may include recording the optical function of a lens or a mirror onto the holographic optical element, which may be a transparent holographic thin film. The step of 102 recording a holographic optical element may include using a reference beam 56 and an object beam 58 from the lens or the mirror as is shown in FIG. 3. Other methods and steps which may be known in the art of holography may be used in recording the holographic optical element.

The method 100 also includes the step of 104 providing a combiner 46 including the holographic optical element 48 on a windshield 32 of a vehicle. The windshield 32 including an inner surface 34 and an outer surface 36 substantially parallel thereto. The step of 104 providing a combiner 46 on a windshield 32 of a vehicle may include disposing the holographic optical element 48 on either of the surfaces 34, 36, such as by adhering the holographic optical element 48 to the windshield 32. The holographic optical element 48 may be adhered to the windshield 32 using, for example, a light-transmissive adhesive film and/or with a liquid optically clear adhesive (LOCA). Alternatively, the holographic optical element 48 may be embedded within the windshield 32 such as, for example, between layers of glass or other material that comprises the windshield 32.

The method 100 includes 106 projecting by a picture generating unit 28, a first light beam 30 to create the virtual image 22. The picture generating unit 28 may use a spatial light modulator (SLM) to generate the first light beam 30, which may be dynamically changeable, such as a video signal. A spatial light modulator may be a transmissive device, such as a Liquid Crystal Display (LCD) or a reflective device, such as a Liquid Crystal on Silicon (LCoS) device. The picture generating unit 28 may also use a micro-electro-mechanical system (MEMS) to generate the first light beam 30.

According to an aspect, and as illustrated in FIG. 2, the method 100 may also include the step of 108 directing the first light beam 30 onto a second mirror 54 by a first mirror 52. The method 100 may also include the step of 110 directing the first light beam 30 onto the combiner 46 by the second mirror 54. One or more of the mirrors 52, 54 may be concave, which may allow the virtual image 22 to be magnified as it is reflected. One or more of the mirrors 52, 54 may be tiltable for adjusting the position of the first beam 30 on the combiner 46, which may thereby adjust the location of the virtual image 22 within the field of view of the viewer 24. The use of the mirrors 52, 54 may also allow the head-up display device 20 to meet packaging requirements, such as, for example, to fit within the dashboard of a vehicle.

The method 100 proceeds with the step of 112 steering the first light beam 30 by the holographic optical element 48 to the viewer 24 as a third light beam 50. As shown in FIG. 2, the third light beam 50 may be directed away from the holographic optical element 48 in at an angle that is different from the angle of incidence α. In other words, the "steering" function means that the interaction between the first light beam 30 and the holographic optical element 48 causes the third light beam 50 to emerge in a direction that is different than would be result from a simple reflection.

The method 100 also includes the step of 114 reflecting, by the inner surface 34, the first light beam 30, as a second light beam 38 away from the viewer 24. The method 100 may further include the step of 118 reflecting, by the outer surface 36, the first light beam 30 as a fourth light beam 42 away from the viewer 24. In other words, and as illustrated in FIG. 2, both reflective surfaces 34, 36 of the windshield 32 may be configured to reflect the first light beam 30 away from the viewer. In this way, the reflected images 40, 44, which could otherwise appear as a double-image, are not visible to the viewer 24.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A head-up display device for displaying a virtual image superimposed over a field of view to a viewer, the head-up display device comprising:
a picture generating unit (PGU) including an illumination source to generate a real image following the direction of a first light beam to create the virtual image;
a windshield of a vehicle including an inner surface and an outer surface substantially parallel to the inner surface, wherein
the inner surface engages the first light beam at an angle of incidence to cause the first light beam to reflect therefrom as a second light beam carrying a first reflected image that is directed away from the viewer to cause the first reflected image to not be visible to the viewer, and
the outer surface engages the first light beam at the angle of incidence to cause the first light beam to reflect therefrom as a fourth light beam carrying a second reflected image that is directed away from the viewer to cause the second reflected image to not be visible to the viewer; and
a combiner positioned on the windshield to intersect with the first light beam, the combiner including a holographic optical element (HOE),
wherein the HOE of the combiner includes a transparent holographic film that interacts with the first light beam such that an angle of incidence of the first light beam with the HOE is not equal to an angle of reflection of a third light beam generated therefrom,
wherein the HOE steers the third light beam in the direction of the viewer to present the virtual image within the field of view of the viewer.

2. The head-up display device as set forth in claim 1 wherein the holographic optical element is disposed on a surface of the windshield.

3. The head-up display device as set forth in claim 1 wherein the holographic optical element is integrated within the windshield.

4. The head-up display device as set forth in claim 1 wherein the illumination source includes a laser.

5. The head-up display device as set forth in claim 1 wherein the illumination source includes a plurality of light sources of different colors.

6. The head-up display device as set forth in claim 1 further including a mirror to provide a folded optical path.

7. The head-up display device as set forth in claim 6 wherein the mirror is a concave mirror.

8. The head-up display device as set forth in claim 1 further including a mirror being tiltable for adjusting the position where the first light beam intersects the combiner and thereby adjusting the location of the virtual image within the field of view of the viewer.

9. The head-up display device as set forth in claim 8 wherein the mirror is a concave mirror.

10. The head-up display device as set forth in claim 1 wherein the holographic optical element was recorded using a reference beam and an object beam to store the optical function of a lens or a mirror used in the recording process.

11. A head-up display device for displaying a virtual image within a field of view to a viewer located at an eye box region of space representing a range of normal viewing positions, the head-up display device comprising:
a picture generating unit (PGU) including an illumination source including a laser to generate a real image following a first light beam to create the virtual image;
a windshield of a vehicle including an inner surface and an outer surface substantially parallel to the inner surface, wherein
the inner surface engages the first light beam at an angle of incidence to cause the first light beam to reflect therefrom as a second light beam carrying a first reflected image that is directed away from the viewer to cause the first reflected image to not be visible to the viewer, and
the outer surface engages the first light beam at the angle of incidence to cause the first light beam to reflect therefrom as a fourth light beam carrying a second reflected image that is directed away from the viewer to cause the second reflected image to not be visible to the viewer; and
a combiner positioned on the windshield to intersect with the first light beam, the combiner including a holographic optical element (HOE), wherein the HOE of the combiner includes a transparent holographic film disposed on at least one of the inner surface and the outer surface of the windshield that interacts with the first light beam such that an angle of incidence of the first light beam with the HOE is not equal to an angle of reflection of a third light beam generated therefrom,
wherein the HOE steers the third light beam in the direction of the viewer to present the virtual image within the field of view of the viewer.

12. A method for displaying a virtual image with a head-up display device comprising:
providing a combiner including a holographic optical element (HOE) on a windshield of a vehicle, wherein the windshield includes an inner surface and an outer surface substantially parallel to the inner surface;
providing a transparent holographic thin film disposed on at least one of the inner surface and the outer surface of the windshield as the HOE of the combiner;
projecting by a picture generating unit (PGU) to generate a real image following a first light beam;
reflecting by the inner surface of the windshield the first light beam at an angle of incidence to cause the first light beam to reflect therefrom as a second light beam carrying a first reflected image away from the viewer to cause the first reflected image to not be visible to the viewer;
reflecting by the outer surface of the windshield the first light beam at an angle of incidence to cause the first light beam to reflect therefrom as a fourth light beam carrying a second reflected image away from the viewer to cause the second reflected image to not be visible to the viewer; and
steering, with the transparent holographic thin film of the HOE, the first light beam to the viewer as a third light beam to present the virtual image within a field of view of the viewer.

13. The method for displaying a virtual image with a head-up display device as set forth in claim 12 further including the step of recording the optical function of a lens or a mirror onto a transparent holographic thin film using a reference beam and an object beam from the lens or the mirror.

14. The method for displaying a virtual image with a head-up display device as set forth in claim 12 further including the step of directing the first light beam onto a second mirror by a first mirror.

15. The method for displaying a virtual image with a head-up display device as set forth in claim 12 further including the step of adjusting the position of the first light beam on the combiner by tilting a mirror.

16. The method for displaying a virtual image with a head-up display device as set forth in claim 12 further including the step of directing the first light beam onto the combiner by a mirror in an active position.

17. The method for displaying a virtual image with a head-up display device as set forth in claim 12 further including the step of directing the first light beam away from the combiner by a mirror in an inactive position.

18. The method for displaying a virtual image with a head-up display device as set forth in claim 12 further including the step of folding the mirror between the active position and the inactive position.

19. The method for displaying a virtual image with a head-up display device as set forth in claim 12, wherein the step of steering the first light beam with the transparent holographic thin film includes that an angle of incidence of the first light beam interacting with the HOE is not equal to an angle of reflection of a third light beam generated therefrom.

\* \* \* \* \*